April 26, 1960  T. TOLLEFSON  2,933,848
FISH LURE GUIDE
Filed Aug. 15, 1958

INVENTOR.
TOLLAK TOLLEFSON
BY
Merchant & Merchant
ATTORNEYS

2,933,848

FISH LURE GUIDE

Tollak Tollefson, Bonilla, S. Dak.

Application August 15, 1958, Serial No. 755,171

1 Claim. (Cl. 43—43.13)

My invention relates generally to fishing gear and more particularly to guides for fish lures.

The primary object of my invention is the provision of a guide for fish lures which may be positioned on a fish line in advance of the lure and which during relative movements of a fisherman with respect to a given body of water will tend to maintain a fish lure in a laterally outwardly spaced relationship to said fisherman.

A further object of my invention is the provision of a device of the class immediately above described in which said guide is provided with a harness which so positions the guide that it constantly tends to pull away from a fisherman when moved relative to the water through which it is drawn, whereby the lateral distance between the fisherman and the lure may be increased or decreased at will by increasing or decreasing the extent of fish line during such movements.

A still further object of my invention is the provision of a device of the class immediately above described in which said harness provides means for varying the degree of outward pull exerted by the guide upon the fish line.

A still further object of my invention is the provision of a device of the class described including an elongated buoyant body having a longitudinally extended depending keel, and in which said keel is formed from ductile metal and defines a rearwardly projecting rudder which may be bent from side to side to still further vary the degree of outward pull exerted by the guide upon the fish line.

A still further object of my invention is the provision of a device of the class immediately above described in which said keel is provided with means for detachably securing thereto weights which vary the buoyancy of the body, whereby to control the depth of the body in the water during its travel therethrough.

A further object of my invention is the provision of a device of the class above described in which said keel is provided with longitudinally spaced means for detachably securing a lure-equipped drag line or two.

A further object of my invention is the provision of a device of the class described which is relatively inexpensive to produce, which is durable in construction and is extremely easy to use.

The above and still further objects of my invention will become apparent from the following detailed specification, appended claim and attached drawings.

Referring to the drawings wherein like characters indicate like parts throughout the several views.

Figure 4:
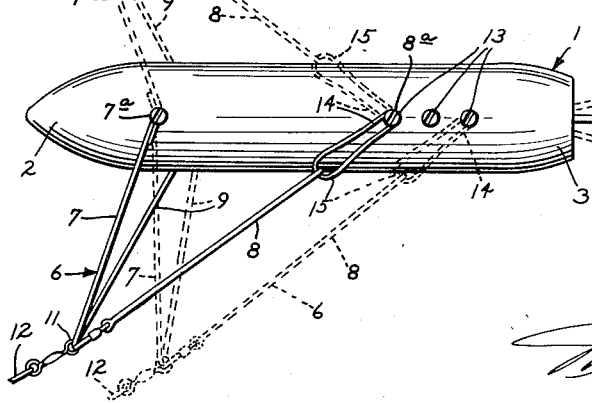
Fig. 4 is a view in top plan.
Figure 5:
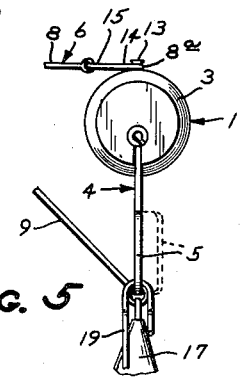
Fig 5 is a fragmentary view in rear elevation.

Referring with greater particularity to the drawings, the numeral 1 indicates an elongated buoyant body, preferably formed from wood or the like and having a relatively pointed nose 2 and a somewhat tapered rear end portion 3. Rigidly secured to and depending from the body 1 is a longitudinally extended keel plate 4, preferably formed from ductile metal and defining at its rear end a reduced rudder 5 which, as shown in Figs. 4 and 5, may be bent from side to side for a purpose which will hereinafter be explained.

Figure 2:
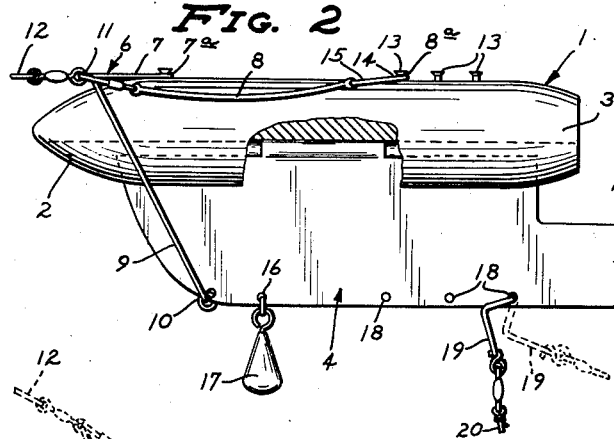
Fig. 2 is a view in side elevation of my novel structure, some parts being broken away and some parts shown in section.
Figure 3:
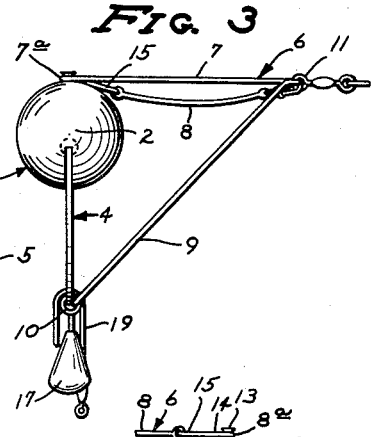
Fig. 3 is a view in front elevation of the structure of Fig. 2.

A harness, identified in its entirety by the numeral 6, is attached to the body 1 for purposes of drawing it through the water. The harness 6 comprises front and rear upper flexible tie members 7 and 8 respectively, the former of which is pivotally secured to the top of the body 1, as indicated at 7a, in the vertical plane of the keel 4 and the latter of which is pivotally secured in rearwardly spaced relationship to the body 1, as indicated at 8a, also in the vertical plane of the keel 4. The harness 6 also includes a lower flexible tie member, identified by the numeral 9, which is pivotally secured to the keel 4, as indicated at 10. The extended ends of the tie members 7, 8 and 9 are suitably tied together as at 11, the relative lengths of said members being such that the connection 11 will be in substantially the horizontal plane of the pivotal connections 7a, 8a when said members 7, 8 and 9 are stretched taut, as shown particularly in Figs. 2 and 3.

The connection 11 of the extended ends of the tie members 7, 8, 9, also provides means for connection of a tow line 12 thereto.

Figure 1:
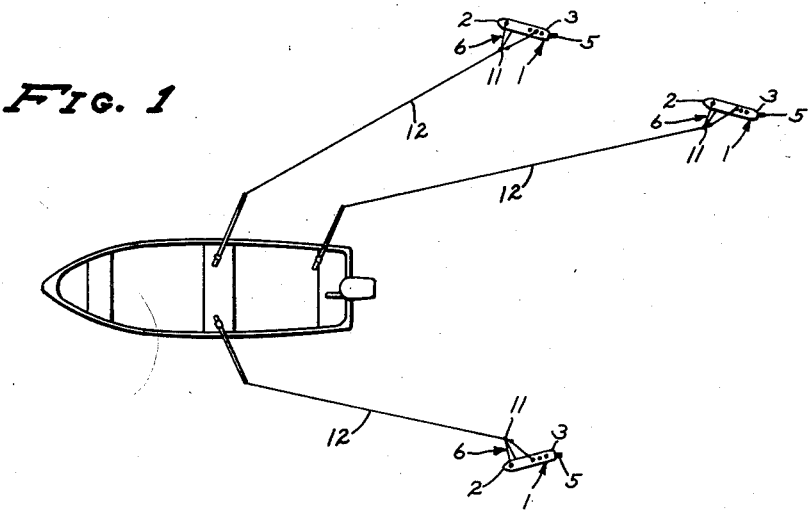
Fig. 1 is a view in top plan of a boat illustrating use of a plurality of my fish lure guides in operation during trolling.

It should be obvious that due to the fact that the connection 11 is always laterally disposed with respect to the longitudinal plane of the body 1 and keel 4, coupled with the further fact that said connection 11 is maintained in substantially the same horizontal plane as the connections 7a and 8a, assures that the keel 4 will be disposed angularly outwardly with respect to its towing force. At the same time, the keel 4 will be retained in a vertical operative position. Note particularly Fig. 1 in this respect.

To vary the degree of outward pull exerted by the body 1 and keel 4 when relative forward movement is imparted thereto, the pivotal connection 8a of the tie member 8 to the body 1 is made longitudinally variable. Specifically, this is accomplished through the medium of a plurality of longitudinally spaced headed screws or the like 13 which are adapted to be received in the reduced ends 14 of elongated spring clips 15 forming part of the flexible tie members 8. In this regard, it will be noted that when the spring clip 15 is detached from any given screw 13, the harness may be readily shifted from one side thereof to the other for the purpose of fishing on a desired side of a boat or stream or for walking in different directions along the shore of a lake, see the dotted lines in Fig. 4.

To vary the buoyancy of the body 1 so as to raise and lower the same with respect to the surface of the body of water through which it is drawn, I provide one or more apertures 16 adjacent the lower edge of the keel 4 for the detachable reception of weights 17. Furthermore, one or more apertures 18 are provided along the lower edge of the keel 4 for detachable reception of a connector element 19 adapted to carry a tow line 20.

As above indicated, more precise adjustments of the outward pull exerted by the keel 4 may be achieved by manipulation of the rudder 5.

My invention has been thoroughly tested and found to be completely satisfactory for the accomplishment of the above objects and while I have shown a preferred embodiment thereof, I wish it to be specifically understood that the same is capable of modification without departure from the scope and spirit of the appended claim.

What I claim is:

In a device of the class described, an elongated buoyant body having a longitudinally extended depending blade-like keel, said keel being formed from ductile metal and defining a bendable reduced rearwardly projecting rudder at its rear end, said keel being provided with means for detachably securing thereto weights which vary the buoyancy of said body and being also provided with longitudinally spaced means for attachment of a lure-equipped drag line thereto, a towing harness for said body, said harness comprising front and rear flexible upper tie members pivotally secured to the body at longitudinally spaced points and in substantially the same horizontal plane, a third flexible tie member pivotally secured to said keel in downwardly spaced relation to said body, said body being provided with means for longitudinally adjusting the pivotal connection of the rear tie member thereto, means securing the outer ends of all of said tie members together in laterally spaced relation to the body and in substantially the same horizontal plane as the pivotal connections of said front and rear tie members to said body when said tie members are stretched taut, said means providing a connection for a tow line, the connection of said rear tie member to said body being detachable to facilitate swinging of said harness from one side of said body to the other thereof.

References Cited in the file of this patent

UNITED STATES PATENTS

| | | |
|---|---|---|
| 1,081,837 | Jordan | Dec. 16, 1913 |
| 1,304,983 | Howerton | May 27, 1919 |
| 2,545,185 | Winslow | Mar. 13, 1951 |
| 2,556,423 | Gross | June 12, 1951 |

FOREIGN PATENTS

| | | |
|---|---|---|
| 74,981 | Norway | 1950 |